(12) United States Patent
Kim et al.

(10) Patent No.: US 9,266,570 B2
(45) Date of Patent: Feb. 23, 2016

(54) UPPER-BODY FRAME FOR VEHICLE

(71) Applicant: HYUNDAI MOTOR COMPANY, Seoul (KR)

(72) Inventors: Gi Hwan Kim, Yongin-si (KR); Chi Hoon Choi, Suwon-si (KR); Se Hee Oh, Daejeon (KR); Ha Rim Choi, Yongin-si (KR); Gunter Roos, Russelsheim (DE); Sven Wittke, Russelsheim (DE)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/532,817

(22) Filed: Nov. 4, 2014

(65) Prior Publication Data
US 2015/0251708 A1    Sep. 10, 2015

(30) Foreign Application Priority Data
Mar. 4, 2014    (KR) .......................... 10-2014-0025759

(51) Int. Cl.
*B62D 25/02*    (2006.01)
*B62D 25/04*    (2006.01)
(Continued)

(52) U.S. Cl.
CPC ............ *B62D 29/046* (2013.01); *B62D 23/005* (2013.01); *B62D 25/04* (2013.01); *B62D 25/06* (2013.01); *B62D 27/023* (2013.01); *B62D 29/043* (2013.01)

(58) Field of Classification Search
CPC ...... B62D 25/02; B62D 25/025; B62D 25/06; B62D 25/08; B62D 25/081; B62D 25/087; B62D 25/20; B62D 25/2009; B62D 25/2036; B62D 29/04; B62D 29/041; B62D 29/046; B62D 25/04025

USPC ............... 296/203.01–205, 193.03, 193.04, 296/193.05, 210
See application file for complete search history.

(56) References Cited

U.S. PATENT DOCUMENTS

| | | | | |
|---|---|---|---|---|
| 1,694,572 A | * | 12/1928 | Weymann | ............... B62D 29/02 181/291 |
| 4,986,597 A | * | 1/1991 | Clausen | ................. B62D 21/00 29/412 |

(Continued)

FOREIGN PATENT DOCUMENTS

| JP | 10-507983 A | 8/1998 |
|---|---|---|
| JP | 2011-245912 A | 12/2011 |

(Continued)

OTHER PUBLICATIONS

Korean Office Action issued in KR10-2014-0025759, dated Jan. 19, 2015.

*Primary Examiner* — Gregory Blankenship
(74) *Attorney, Agent, or Firm* — McDermott Will & Emery LLP

(57) ABSTRACT

An upper-body frame for a vehicle includes a roof frame which is made of a carbon fiber composite material, and which forms a perimeter frame of a roof of the vehicle, and has a closed-loop shape. Door frames which are made of carbon fiber composite material, and form respective perimeter frames of door opening parts of a vehicle body, and each of which has an upper part that is connected to a corresponding side part of the roof frame. A windshield frame is made of a carbon fiber composite material and forms a perimeter frame of a windshield opening part of the vehicle. The windshield frame has an upper part which is connected to a front part of the roof frame, and side parts which is connected to respective front parts of the door frames.

13 Claims, 3 Drawing Sheets

(51) Int. Cl.
  *B62D 25/06* (2006.01)
  *B62D 29/04* (2006.01)
  *B62D 23/00* (2006.01)
  *B62D 27/02* (2006.01)

(56) References Cited

U.S. PATENT DOCUMENTS

| | | | | |
|---|---|---|---|---|
| 5,213,386 | A * | 5/1993 | Janotik | B62D 23/005 280/785 |
| 5,332,281 | A * | 7/1994 | Janotik | B62D 21/02 296/203.03 |
| 5,338,080 | A * | 8/1994 | Janotik | B62D 23/005 280/785 |
| 6,022,070 | A * | 2/2000 | Ashina | B62D 23/005 296/205 |
| 6,296,301 | B1 * | 10/2001 | Schroeder | B62D 29/046 296/187.02 |
| 7,125,067 | B2 | 10/2006 | Bonnett et al. | |
| 7,503,576 | B1 | 3/2009 | Schroeder | |
| 8,851,558 | B2 * | 10/2014 | Asaga | B62D 23/005 296/203.01 |
| 2001/0033096 | A1 * | 10/2001 | Hanyu | B62D 21/15 296/203.01 |
| 2004/0104601 | A1 * | 6/2004 | Durand | B62D 23/005 296/203.01 |
| 2005/0001455 | A1 * | 1/2005 | White | B62D 23/00 296/203.01 |
| 2005/0046238 | A1 * | 3/2005 | Miyoshi | B62D 25/2036 296/203.03 |
| 2008/0001437 | A1 * | 1/2008 | Balzer | B62D 23/005 296/203.03 |
| 2008/0169685 | A1 * | 7/2008 | Hedderly | B62D 27/023 296/203.01 |
| 2008/0203768 | A1 * | 8/2008 | Lowe | B62D 25/00 296/205 |
| 2010/0237661 | A1 * | 9/2010 | Baccouche | B62D 25/06 296/210 |
| 2012/0104803 | A1 * | 5/2012 | Thomas | B62D 29/046 296/203.01 |
| 2013/0313863 | A1 * | 11/2013 | Yamaji | B62D 25/00 296/203.01 |
| 2015/0251708 | A1 * | 9/2015 | Kim | B62D 29/046 296/203.01 |

FOREIGN PATENT DOCUMENTS

| | | |
|---|---|---|
| KR | 10-1998-0702667 A | 8/1998 |
| KR | 10-2003-0000113 A | 1/2003 |
| WO | 2012-105716 A1 | 8/2012 |

* cited by examiner

UPPER-BODY FRAME FOR VEHICLE

CROSS-REFERENCE TO RELATED APPLICATION

The present application claims the benefit of priority to Korean Patent Application Number 10-2014-0025759 filed on Mar. 4, 2014, the entire contents of which application are incorporated herein for all purposes by this reference.

TECHNICAL FIELD

The present disclosure relates to an upper-body frame for a vehicle which is manufactured using a carbon fiber composite material so that the rigidity of the frame can be enhanced and the weight thereof can be reduced.

BACKGROUND

In conventional steel body in white (BIW) upper-body frames, as shown in FIG. 1, opening parts of the roof, side, windshield, and lead frames form individual section structures, and frames of the opening parts partially form open sections. That is, as shown in portions A and B, ends of each member are discontinuous as if they are cut off. The discontinuous ends of the member are separately connected to other frames.

Because of such opening parts and open sections of the upper-body frames, it is difficult to ensure the rigidity of a vehicle body, the strength of a roof, and the durability of the vehicle body. Furthermore, to form a closed section structure, the number of elements needed for assembling and connecting the frames is increased, and the assembly process is complicated.

Moreover, in the conventional discontinuous-member connection structure, it is difficult to ensure a sufficient strength of the vehicle body to maintain space for passengers when a vehicle collision or rollover occurs.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the prior art. An aspect of the present disclosure provides an upper-body frame for a vehicle which is manufactured using a carbon fiber composite material so that the rigidity of the frame can be enhanced and the weight thereof can be reduced.

According to an exemplary embodiment of the present inventive concept, an upper-body frame for a vehicle includes a roof frame forming a perimeter frame of a roof of the vehicle and having a closed-loop shape. A door frame forms a perimeter frame of a door opening part of a vehicle body, the door frame has a door frame upper part connected to a roof frame side part, and the door frame upper part is in close contact with the roof frame side part. A windshield frame forms a perimeter frame of a windshield opening part of the vehicle and has a windshield frame upper part connected to a front part of the roof frame, and the windshield frame upper part is in close contact with the door frame front part. A windshield frame side part is connected to a door frame front part, and the windshield frame side part is in close contact with the door frame front part.

The door frame may be the perimeter frame of the door opening part of the vehicle body and has a closed-loop shape.

The windshield frame may include the windshield frame upper part forming an upper end of the windshield opening part and the windshield frame side part, in a plural form, forms respective opposite side ends of the windshield opening part.

The upper-body frame may further include a door seal frame provided under a lower end of the door opening part of the vehicle body and forming a door seal. The door seal frame may be in contact with a door frame lower part. Front and rear ends of the door seal frame may respectively extend along the door frame front part and a door frame rear part of the door frame while making close contact with the front and rear parts of the door frame and then be respectively bent towards front and rear ends of the vehicle.

Furthermore, an upper half of the front part of each of the door frames may be brought into close contact with the windshield frame, and a lower half of the front part of the door frame may be brought into close contact with the corresponding door seal frame. A triangular closed loop may be defined in a junction among each of the door frames, the windshield frame and the corresponding door seal frame.

The upper-body frame may further include a trunk frame made of a carbon fiber composite material and brought into close contact with a rear part of the roof frame, the trunk frame forming a perimeter frame of a trunk opening part of the vehicle. The rear end of each of the door seal frames may be brought into close contact with a corresponding side part of the trunk frame, and a closed loop may be defined in a junction among the roof frame, each of the door seal frames and the trunk frame.

In addition, opposite side parts of the windshield frame may extend forwards, and a cowl cross frame may be disposed between and connected to the opposite side parts of the windshield frame.

Furthermore, a lower half of the rear part of each of the door frames may be brought into close contact with the corresponding door seal frame.

As described above, an upper-body frame for a vehicle according to the present disclosure is manufactured using a carbon fiber composite material so that the rigidity of the upper-body frame can be increased while the weight thereof is reduced.

Particularly, discontinuous rigidity characteristics on the junctions between the frames can be prevented. By virtue of an integrated forming process, continuous rigidity can be provided, and there are various advantages in manufacturing the upper-body frame.

Furthermore, a load can be effectively dispersed due to high connectivity when collision occurs.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Hereinafter, an embodiment of the present inventive concept will be described in detail with reference to the attached drawings.

Figure 1:
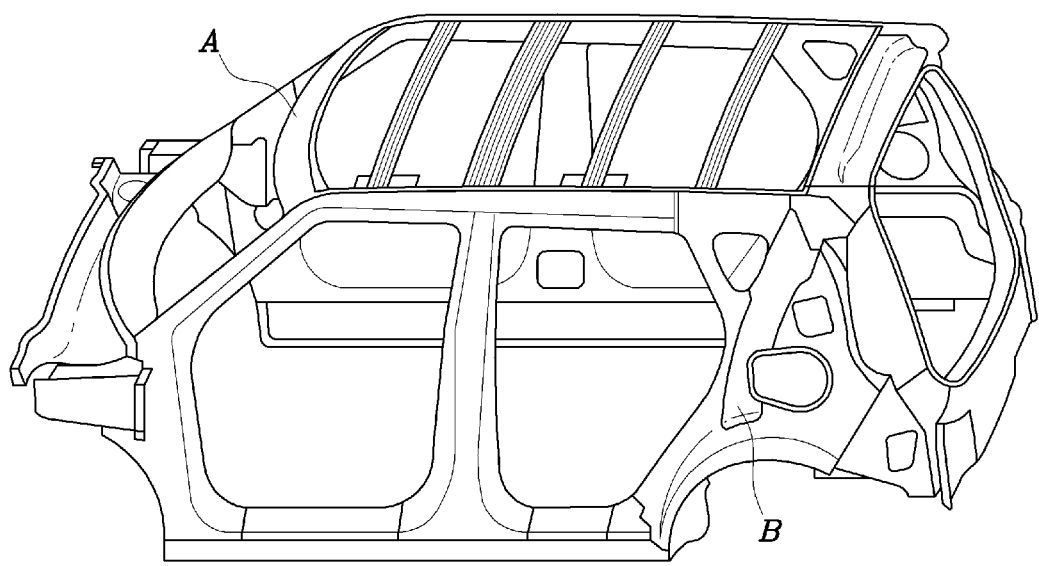
FIG. 1 is a view showing an upper-body frame for a vehicle according to a related art.
Figure 2:
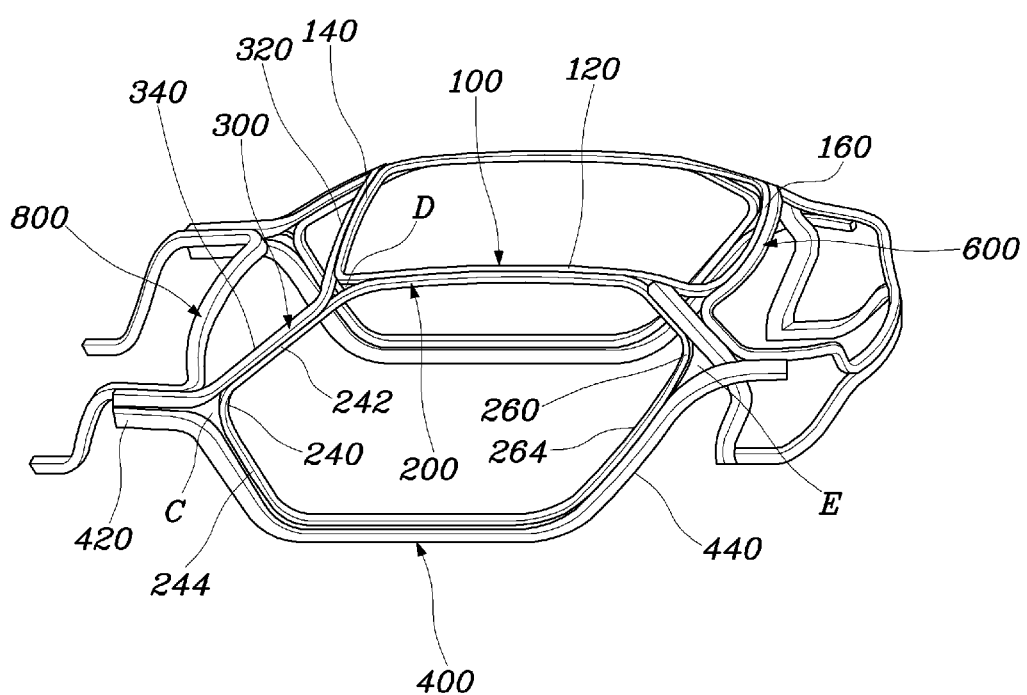
FIG. 2 is a view illustrating an upper-body frame for a vehicle according to an embodiment of the present inventive concept.
Figure 3:
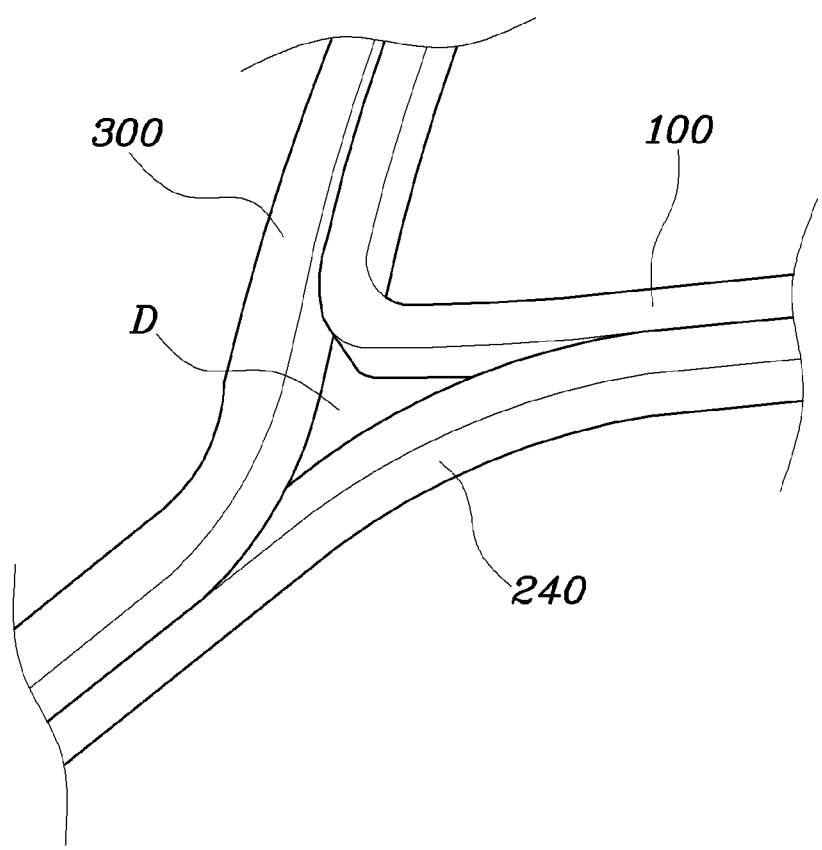
FIG. 3 is a view showing an enlargement of portion D of the upper-body frame of FIG. 2.

FIG. 2 is a view illustrating an upper-body frame for a vehicle according to the embodiment of the present inventive concept. FIG. 3 is a view showing an enlargement of portion D of the upper-body frame of FIG. 2.

The upper-body frame for a vehicle according to the present inventive concept includes a roof frame 100 which is made of a carbon fiber composite material. The frame 10 is a perimeter frame of a roof of the vehicle and has a closed-loop shape. Door frames 200 are made of a carbon fiber composite material and form respective perimeter frames of door opening parts of a vehicle body. Each of the frames 200 has an upper end connected to a corresponding side part 120 of the roof frame 100 while close contacting the side part 120. A windshield frame 300 is made of carbon fiber composite material and forms a perimeter frame of a windshield opening part of the vehicle. The windshield frame 300 includes an upper part 320 connected to a front part 140 of the roof frame 100 while contacting the front part 140. Side parts 340 connected to respective front parts 240 of the door frames 200 while contacting the front parts 240.

As shown in FIG. 2, the upper-body frame includes the roof frame 100, the door frames 200, the windshield frame 300, door seal frames 400, a trunk frame 600 and a cowl cross frame 800. These frames are made of a carbon fiber composite material and are connected to each other by structural adhesive.

The roof frame 100 forms the perimeter frame of the roof of the vehicle and has a rectangular closed-loop shape. The embodiment shown in the drawings shows an example in which a rear glass side frame is formed by the roof frame 100.

The door frames 200 are also made of a carbon fiber composite material and form the perimeter frame of the respective door opening part formed in the vehicle body. An upper part of each door frame 200 is connected to the corresponding side part 120 of the roof frame 100 while making close contact with the side part 120. The embodiment shown in the drawings shows a two-door coupe. Therefore, the two door frames 200 are respectively provided on opposite sides of the vehicle. The upper part of each door frame 200 is brought into surface contact with the corresponding side part 120 of the roof frame 100.

The windshield frame 300 is made of a carbon fiber composite material and forms the perimeter frame of the windshield opening part of the vehicle. An upper part of the windshield frame 300 is brought into close contact with the front part 140 of the roof frame 100 and is coupled to the front part 140. Furthermore, the side parts 340 of the windshield frame 300 are brought into close contact with the front parts 240 of the corresponding door frames 200 and are coupled to the front parts 240. The frames have a surface-to-surface bonding structure between them such that the connection rigidity at junctions between the frames can be as large as possible without the frames being disconnected from each other.

The door frames 200 are the perimeter frames of the door opening parts of the vehicle body. Each door frame 200 has a closed-loop shape in the same manner as that of the roof frame 100. That is, all of the roof frame 100 and the door frames 200 have a closed-loop shape such that the torsional rigidity is as large as possible.

Forming respective lower ends of the door side parts of the vehicle body, the door seal frames 400 are coupled to the lower end of the vehicle body. The door seal frames 400, made of a carbon fiber composite material, respectively form lower door seals of the door opening parts of the vehicle body. Each door seal frame 400 is brought into close contact with the lower part of the corresponding door frame 200. Opposite ends of each door seal frame 400 respectively extend along the front part 240 and a rear part 260 of the corresponding door frame 200 while making close contact with the front and rear parts 240 and 260 and are respectively bent towards the front and rear of the vehicle.

The windshield frame 300 includes the upper part 320 which forms the upper end of the windshield opening part, and the side parts 340 which respectively form opposite side ends of the windshield opening part. An upper half 242 of the front part 240 of each door frame 200 is brought into close contact with the windshield frame 300, and a lower half 244 of the front part 240 is bought into close contact with the corresponding door seal frame 400.

A triangular closed loop C is defined among each door frame 200 forming a hollow space, the windshield frame 300 and the corresponding door seal frame 400. By virtue of the closed loop C, the rigidity of the junction among the frames can be sufficiently ensured without the frames being disconnected from each other. The closed loop C reliably forms a load carrying path among the frames. In the same manner, a closed loop D is defined in each of the corners at which the roof frame 100, the door frames 200 and the windshield frame 300 meet each other.

The trunk frame 600 is also made of a carbon fiber composite material, is brought into close contact with a rear part 160 of the roof frame 100, and forms the perimeter frame of the trunk opening part.

A rear part 440 of each door seal frame 400, extending rearwards, is brought into close contact with a corresponding side part of the trunk frame 600. A closed loop E is also defined in the junction among the roof frame 100, each door seal frame 400 and the trunk frame 600.

The opposite side parts 340 of the windshield frame 300 extend a predetermined length forwards. The cowl cross frame 800 is disposed between and connected to the extending opposite side parts 340 of the windshield frame 300. The lower half 264 of the rear part 260 of the door frame 200 is brought into close contact with the door seal frame 400.

As such, using the high formability of a carbon fiber composite material, the present disclosure can permit a design, through an integrated forming process, such that the opening parts of the roof, side, windshield, and lead frames have double closed section structures. Furthermore, a closed loop is formed in the junction among the three or more frames, whereby the connectivity between the frames can be improved. In addition, the rigidity of the vehicle body, the strength of the roof and the durability of the vehicle body can be enhanced by the closed loops formed between the frames. Furthermore, the number of frames can be markedly reduced by virtue of a simple structure.

As described above, an upper-body frame for a vehicle according to the present disclosure is manufactured using a carbon fiber composite material so that the rigidity of the upper-body frame can be increased while the weight thereof is reduced.

Particularly, discontinuous rigidity characteristics that cause disconnection between the frames at the junctions thereof can be prevented. An impactive load carrying path can be formed without being discontinuous. By virtue of an integrated forming process, continuous rigidity can be provided, and there are various advantages in manufacturing the upper-body frame.

Furthermore, a load can be effectively dispersed when a collision occurs due to high connectivity.

Although the embodiment of the present inventive concept has been disclosed for illustrative purposes, those skilled in the art will appreciate that various modifications, additions and substitutions are possible, without departing from the scope and spirit of the invention as disclosed in the accompanying claims.

What is claimed is:

1. An upper-body frame for a vehicle, comprising:
    a roof frame forming a perimeter frame of a roof of the vehicle and having a closed-loop shape;
    a door frame forming a perimeter frame of a door opening part of a vehicle body, the door frame having a door frame upper part connected to a roof frame side part, the door frame upper part closely contacting the roof frame side part;
    a windshield frame forming a perimeter frame of a windshield opening part of the vehicle; and
    a door seal frame provided under a lower end of the door opening part of the vehicle body, the door seal frame forming a door seal,
    wherein the windshield frame comprises:
        a windshield frame upper part connected to a roof frame front part, the windshield frame upper part closely contacting the roof frame front part; and
        a windshield frame side part connected to a door frame front part, the windshield frame side part closely contacting the door frame front part,
    wherein the door seal frame is in close contact with a door frame lower part, and front and rear ends of the door seal frame respectively extend along the door frame front part and a door frame rear part, and
    wherein the front and rear ends of the door seal frame are in close contact with the door frame front and rear parts, respectively and bend towards front and rear ends of the vehicle.

2. The upper-body frame as set forth in claim 1, wherein the door frame is the perimeter frame of the door opening part of the vehicle body and has a closed-loop shape.

3. The upper-body frame as set forth in claim 1, wherein the windshield frame comprises:
    the windshield frame upper part forming an upper end of the windshield opening part; and
    the windshield frame side part, in a plural form, forming respective opposite side ends of the windshield opening part.

4. The upper-body frame as set forth in claim 1, wherein an upper half of the door frame front part is in close contact with the windshield frame, and a lower half of the door frame front part is in close contact with the door seal frame, and
    a triangular closed loop is formed at a junction of the door frame, the windshield frame, and the door seal frame.

5. The upper-body frame as set forth in claim 1, further comprising:
    a trunk frame closely contacting a roof frame rear part, the trunk frame forming a perimeter frame of a trunk opening part of the vehicle,
    wherein a door seal frame rear part is in close contact with a trunk frame side part, and a closed loop is formed at a junction of the roof frame, the door seal frame, and the trunk frame.

6. The upper-body frame as set forth in claim 1, wherein the windshield frame side part is provided in plural and disposed in the opposite side, extending forwards, and a cowl cross frame is disposed between and connected to the windshield frame side parts.

7. The upper-body frame as set forth in claim 1, wherein a lower half of the door frame rear part is in close contact with the door seal frame.

8. The upper-body frame as set forth in claim 1, wherein the roof frame is made of a carbon fiber composite material.

9. The upper-body frame as set forth in claim 1, wherein the door frame is made of a carbon fiber composite material.

10. The upper-body frame as set forth in claim 1, wherein the windshield frame is made of a carbon fiber composite material.

11. The upper-body frame as set forth in claim 1, wherein the door seal frame is made of a carbon fiber composite material.

12. The upper-body frame as set forth in claim 5, the trunk frame is made of a carbon fiber composite material.

13. The upper-body frame as set forth in claim 1, wherein the door frame is in plural.

* * * * *